(12) United States Patent
Chou et al.

(10) Patent No.: US 7,002,931 B2
(45) Date of Patent: Feb. 21, 2006

(54) POWER EFFICIENT LINE DRIVER WITH HIGH PERFORMANCE ECHO CANCELLATION FOR 1000BASE-T

(75) Inventors: Gerchih Chou, San Jose, CA (US); Leon Chia-Liang Lin, Union City, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 934 days.

(21) Appl. No.: 10/061,924

(22) Filed: Jan. 31, 2002

(65) Prior Publication Data

US 2003/0142688 A1 Jul. 31, 2003

(51) Int. Cl.
*H04B 3/20* (2006.01)

(52) U.S. Cl. ............... 370/286; 375/219; 307/401; 307/43; 307/71; 326/30; 326/62; 327/108; 370/463; 370/420

(58) Field of Classification Search ........... 370/201, 370/286, 282, 276, 420, 463; 379/406.01; 375/219; 307/401, 43, 71; 326/30, 62; 327/108

See application file for complete search history.

(56) References Cited

U.S. PATENT DOCUMENTS

| | | | |
|---|---|---|---|
| 6,618,480 B1 * | 9/2003 | Polley et al. | 379/406.05 |
| 6,795,493 B1 * | 9/2004 | Huang | 375/219 |
| 6,823,028 B1 * | 11/2004 | Phanse | 375/345 |
| 2002/0176570 A1 * | 11/2002 | Apfel | 379/406.01 |

* cited by examiner

*Primary Examiner*—Ajit Patel
(74) *Attorney, Agent, or Firm*—Eschweiler & Associates, LLC (57) ABSTRACT

A 1000BASE-T transceiver linked to an unshielded twisted pair (UTP) through a transformer currently transmits and receives outgoing and incoming signals via the UTP. The transceiver employs an energy efficient class B or AB line driver supplying asymmetric output currents to the transformer's primary winding terminals so that the transformer's secondary winding induces the outgoing signal on the UTP. Resistors couple the transformer's primary winding terminals to inputs of separate amplifiers producing a differential output signal mimicking the incoming 1000BASE-T signal. Since both the incoming and outgoing signals contribute to voltages appearing at the transformer's primary winding terminals, echo cancellation circuits provide additional compensating signals to the amplifier inputs for canceling echo in each amplifier input due to the resistive and reactive loading on each driver output current and arising from the asymmetric nature of the class B or AB driver's output currents.

28 Claims, 6 Drawing Sheets

POWER EFFICIENT LINE DRIVER WITH HIGH PERFORMANCE ECHO CANCELLATION FOR 1000BASE-T

BACKGROUND OF THE INVENTION

1. Field of the Invention

The present invention relates to transceivers for concurrently transmitting and receiving signals through unshielded twisted pairs, and particularly to a transceiver employing a high efficiency driver and providing echo cancellation.

2. Description of Related Art

The IEEE 802.3ab ("Ethernet") standard defines a digital media interface commonly used for transmitting data between computers linked through a network. The standard includes a "1000BASE-T" protocol enabling transceivers to communicate with one another through pulse amplitude modulation (PAM) signals conveyed on a set of four category 5 (CAT5) unshielded twisted-pair (UTP) conductors. A transceiver operating in accordance with the 1000BASE-T protocol can transmit and receive one 8-bit word every 8 nsec, thereby providing an effective communication rate of one Gigabit per second in both directions.

Since each bit combination of a data word may be treated as a symbol, for example representing a number or letter, an 8-bit word can be any of 256 different symbols. A 1000BASE-T transceiver maps the 256 symbols into combinations of voltage levels of the set of four PAM signals, and it can change the PAM signal voltage levels every 8 ns.

As a differential 1000BASE-T signal passes from a transmitter to a receiver via a UTP conductor it is distorted in various ways. When the signal has relatively few transitions during a relatively long period, it acts as a low frequency signal. Magnetic coupling modules that link the UTP cables to the transceivers act like high pass filters which attenuate low frequency signal components, thereby causing a type of distortion known as "baseline wander". "Insertion loss" is signal distortion caused by attenuation through the impedance of the UTP cable conveying the 1000BASE-T signals between transceivers. Since 1000BASE-T transceiver can transmit and receive signals concurrently over the same twisted pair, its outgoing signal can cause "echo" distortion in the incoming signal. Since the four UTP are bundled into the same cable and are unshielded, an outgoing signal departing on any one of the UTPs will cause some "near end crosstalk" (NEXT) distortion in the signals departing on the other UTPs and an incoming 1000BASE-T signal arriving on any one UTP will cause some "far end crosstalk" (FEXT) distortion in the incoming signals arriving on the other three UTPs. Since the four UTPs may have slightly different number of twists per unit length, the actual lengths of the four UTPs within the same cable may differ, and the four UTPs may provide differing signal path delays. Therefore the four signals passing over the four UTPs can have a timing mismatch when they arrive at a receiver. 1000BASE-T transceivers include circuits for compensating incoming 1000BASE-T signals for all of these types of distortion.

1000BASE-T Transceiver

Figure 1:
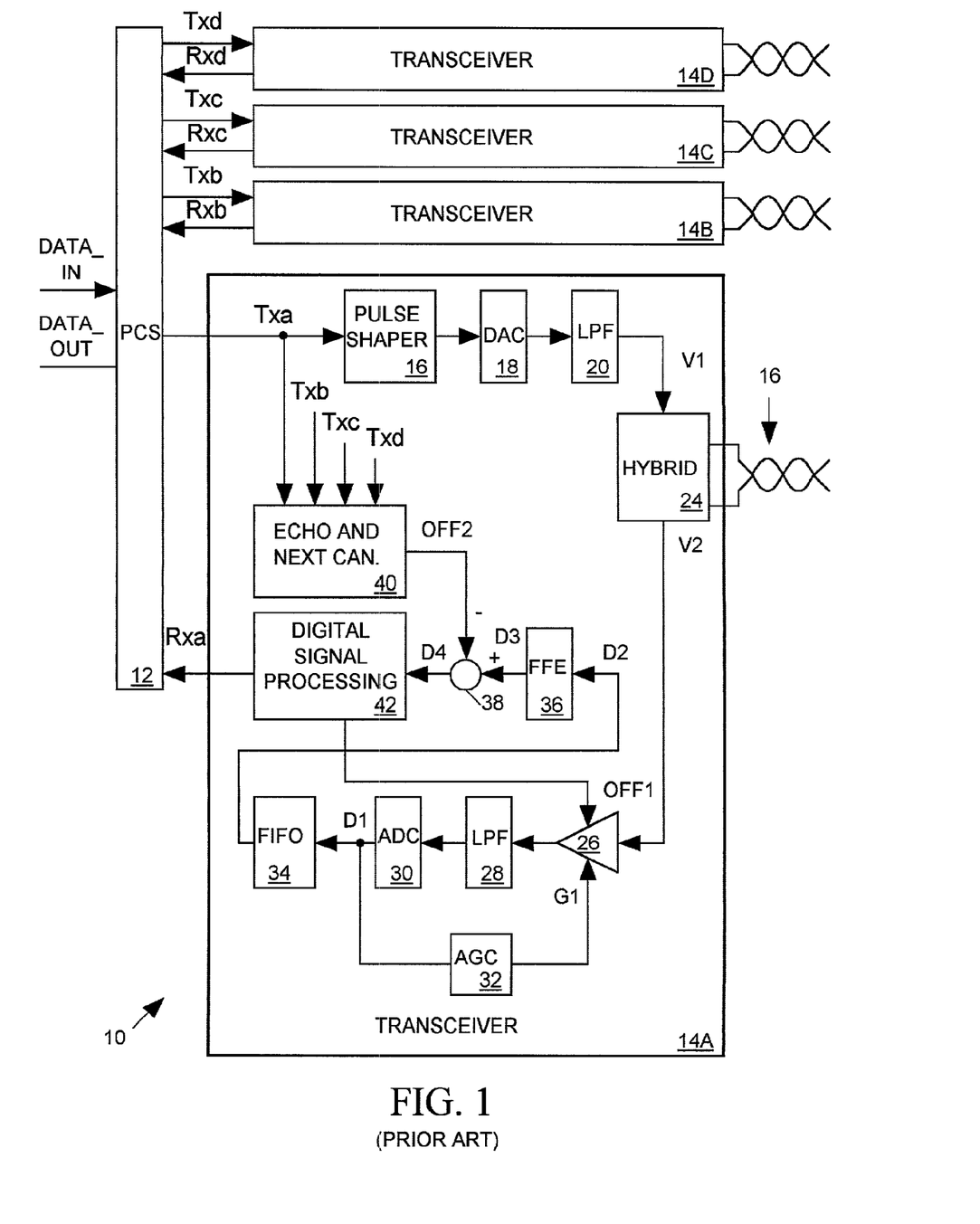
FIG. 1 illustrates in block diagram form a prior art 1000BASE-T transceiver system.

FIG. 1 illustrates a prior art 1000BASE-T transceiver 10 in block diagram form. Transceiver 10 includes a transmit physical coding sublayer (PCS) 12 for scrambling and encoding an incoming sequence of 8-bit words (DATA_IN) to produce four separate sequences of 3-bit data words Txa–Txd, each of which represents an integer value of the set {−2, −1, 0, +1 or +2} referencing one of five PMA-5 symbols. Each data sequence Txa–Txd is supplied as input to a separate one of a set of four transceivers 14A–14D, each of which transmits an outgoing 1000BASE-T signal on a separate one of four UTPs 16. The Txa–Txd sequence input to each transceiver 14A–14D controls the level of its outgoing 1000BASE-T signal. Each transceiver 14A–14D also detects the data sequence Rxa–Rxd conveyed by a separate one of the incoming 1000BASE-T signals arriving on UTPs 16 and supplies it as input to PCS 12. PCS 12 decodes and de-scrambles the Rxa–Rxd sequences to generate a data sequence (DATA_OUT) conveyed by the four incoming 1000BASE-T signals.

Each transceiver 14A–14D includes a pulse shaper 16 for converting its input Txa–Txd sequence into a data sequence indicating the shape of the outgoing 1000BASE-T signal to be produced. A digital-to-analog converter (DAC) 18 converts that sequence into an analog signal, and a low pass filter 20 filters the DAC output signal to produce a differential signal V1. A driver within a hybrid 24 amplifies the V1 signal to produce the outgoing 1000BASE-T signal transmitted on UTP 16.

Hybrid 24 receives the incoming 1000BASE-T signal arriving on UTP 16 and provides it as an input signal V2 to an amplifier 26 having gain and offset controlled by signals G1 and OFF1. A low pass filter 28 and an analog-to-digital converter (ADC) 30 filter and digitize the incoming signal V2 to produce a sequence of data elements D1. An automatic gain control (AGC) circuit 32 monitors D1 and controls the gain G1 of receiver to compensate for insertion loss and to make sure that the peak-to-peak amplitude of the ADC's analog input signal remains close to the its full input range. A FIFO buffer 34 delays the D1 sequence to produce a sequence D2 that is synchronized to local clocks. An adaptive feedforward equalizer (FFE) 36 compensates the D2 sequence for distortions introduced by UTP 16 to produce a sequence D3.

Echo Cancellation

Although hybrid 24 cancels much of the echo of the outgoing 1000BASE-T signal in the V2 signal supplied to amplifier 26, some echo distortion caused by the outgoing 1000BASE-T signal remains in the V2 signal and the D3 sequence. Since the outgoing 1000BASE-T signals departing other three UTPs 16 also induce near end crosstalk (NEXT) distortion in incoming 1000BASE-T signal that distortion is reflected in the V2 signal and the D3 sequence. An echo/NEXT canceller circuit 40 monitors the Txa–Txd sequence received by all four transceivers 14 and supplies an offset data sequence OFF2 to a summer 38 representing the magnitude of echo and NEXT distortion that the four outgoing signals produce in the incoming 1000BASE-T signal. Summer 38 subtracts the OFF2 sequence generated by echo/NEXT canceller 40 from the data sequence D3 produced by FFE 36 to produce a data sequence D4. Digital signal processing circuits 42 process the D4 sequence to detect and forward the Rxa sequence input to PCS 12, to produce clock signals for controlling FIFO buffer 34 and ADC 30, and to provide the OFF1 control input to amplifier 26.

The amplitudes of the incoming and outgoing 1000BASE-T signals are additive at the hybrid's input/output terminals, and if hybrid 24 did not cancel most of the echo from the V2 signal, then in the worst case the peak-to-peak amplitude of the V2 signal would be about twice as large. Echo/NEXT canceling circuit 40 could be adapted to cancel all of the outgoing 1000BASE-T signal echo from the D3 data sequence derived from V2, but in order to achieve the same resolution over twice the range, ADC 30 would have to be increased in width by an extra bit. Adding a bit to ADC 30 doubles the number of components within ADC 30 and substantially increases the transceiver's power consumption. Hence it is preferable to provide a hybrid 24 that cancels as much of the echo of the outgoing 1000BASE-T signal as possible from the V2 signal supplied to amplifier 26.

Hybrid

Figure 2:
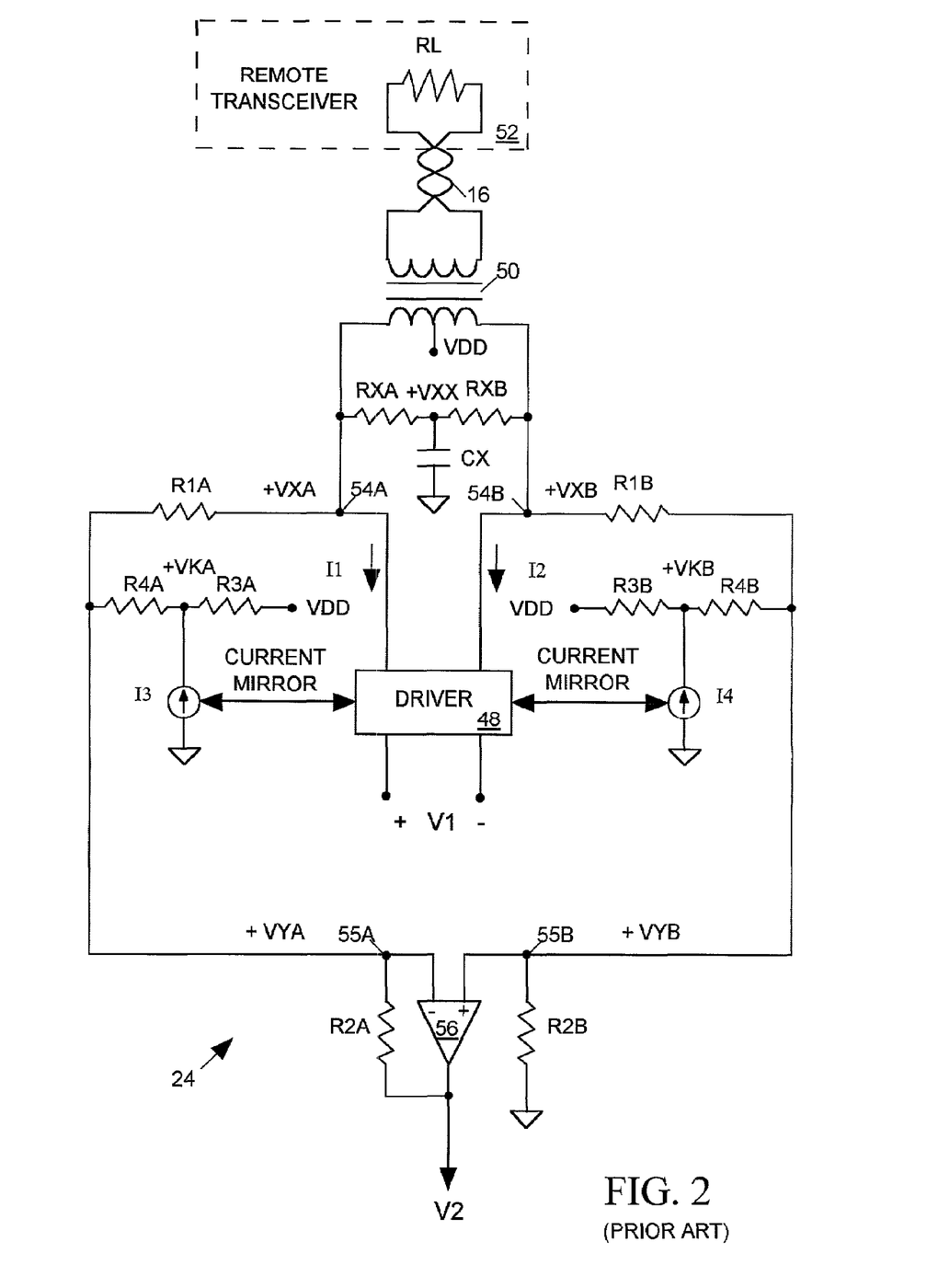
FIG. 2 illustrates in block and schematic diagram form a prior art hybrid suitable for use in the transceivers of FIG. 1, FIGS. 3–5 are timing diagrams illustrating behavior of signals of the hybrid of FIG. 2.
Figure 3:
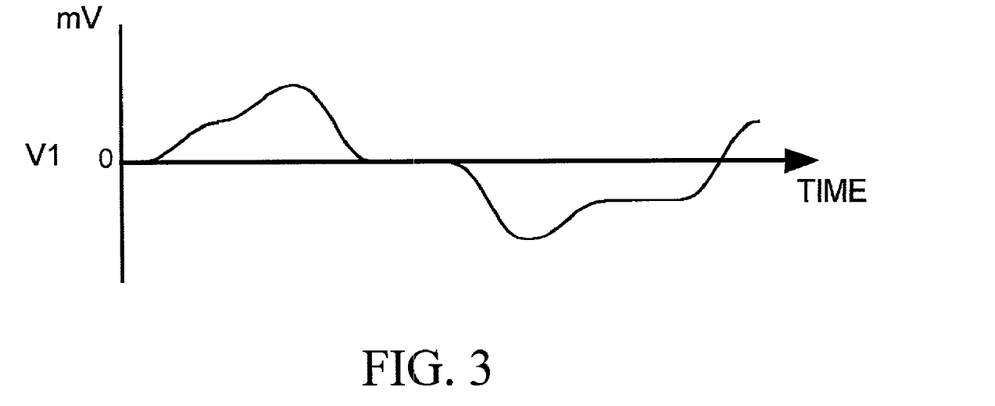
Figure 4:
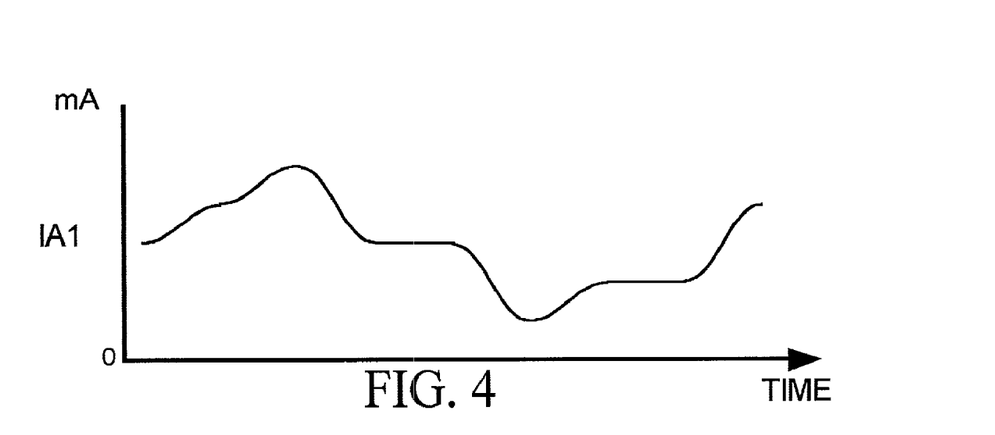
Figure 5:
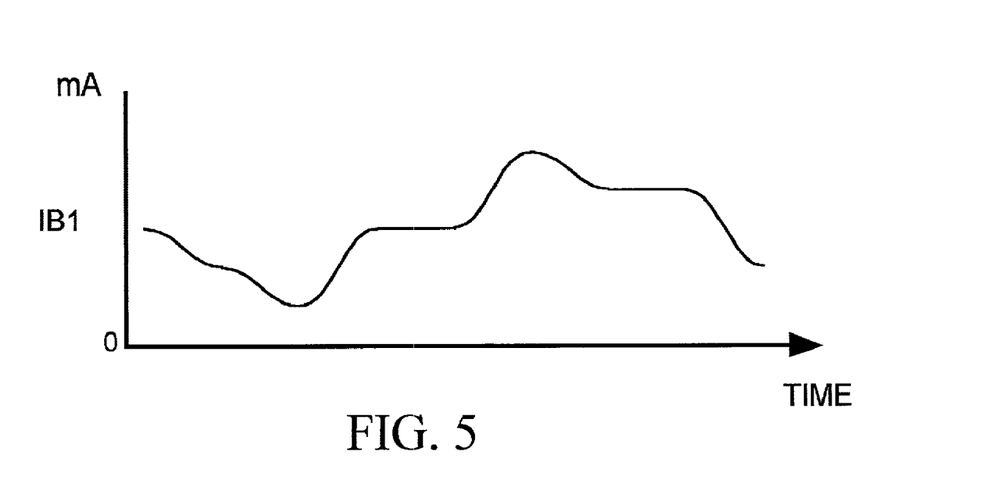

FIG. 2 illustrates a typical hybrid 24 in more detail. A class A driver 48 amplifies the V1 signal to produce a pair of currents I1 and I2 supplied to nodes 54A and 54B at opposite ends of a primary winding of a transformer 50 having a center tap tied to a voltage source VDD. FIG. 3 is a timing diagram illustrating an example 5-level V1 waveform and FIGS. 4 and 5 show the behavior of the output currents I1 and I2 driver 48 produces in response to the V1 signal. Note that output current I1 and I2 of the class A driver 48 are symmetric about a non-zero current level and that they both continuously vary with the magnitude or polarity of V1.

Referring again to FIG. 2, a pair of load resistors RXA and RXB and a capacitor CX couple nodes 54A and 54B to ground. UTP 16 links the secondary winding of transformer 50 to a remote transceiver 52 modeled by its input/output resistance RL. The V2 signal supplied to amplifier 26 of FIG. 1 is produced by an amplifier 56 having inverting and non-inverting inputs respectively coupled to nodes 55A and 55B. A resistor R2A links the output and inverting input of amplifier 56 and a resistor R2B couples its noninverting input to ground. A pair of resistors R1 and R2 link nodes 54A and 54B to nodes 55A and 55B. The V2 signal represents an amplified difference between the voltages VYA and VYB at the amplifier inputs.

The magnitudes of the voltages VXA and VXB developed at nodes 54A and 54B, and therefore voltages VYA and VYB at the amplifier inputs result partly from the load seen by the output currents I1 and I2 of driver 48 and partly from the load seen by the currents induced in the transformer's primary winding by the incoming 1000BASE-T signal from remote transceiver 52. Hybrid 24 includes echo cancellation circuits for canceling the effects of driver output currents I1 and I2 on the voltages VYA and VYB at the inputs of amplifier 56 so that its output signal V2 reflects primarily the magnitude of the incoming 1000BASE-T signal.

The echo cancellation circuit for current I1 includes a resistor network R3A and R4A and a current source I3. Current source I3 and a current source within driver 48 producing current I1 form a current mirror such that current source I3 produces a relatively small output current that is proportional to current I1. Resistors R3A and R4A are coupled in series between VDD and the inverting input of driver 56A, and the current output of source I3 is delivered to the node between resistors R3A and R4A. Resistors R1A–R4A are suitably made relatively large so that they do not present a significant load to current I1.

The voltage drop across load resistor RXA is proportional to the current it conducts. One portion of that current is provided by source I1 and tends to pull down on VXA, thereby reducing the current input to node 55A. Another portion or the current through RXA is provided by transformer 50 in response to the incoming 1000BASE-T signal. Thus the voltage VXA at node 54A and the voltage VYA at node 55A at the inverting input of amplifier 56 are both influenced by current I1 and by the incoming 1000BASE-T signal. However with current I3 being proportional to current I1 and with resistors R3A and R4A being appropriately scaled, the voltage VKA developed by source I3 will supply a current I5 into node 55A that matches the reduction in current into node 55A resulting from the resistive load RXA on current I1. Thus while the portion of the current I1 passing through load resistor RXA influences VYA, the echo compensation circuit formed by resistors R3A, R4A and current source I3 cancels that influence. Hybrid 24 includes another echo cancellation circuit including a resistors R3B and R4B and a current source I4 mirroring current I2 for supplying a current I6 into node N4 canceling the effects of I2 resistive loading on the voltage VYB at the non-inverting input of amplifier 56.

The two echo cancellation circuits therefore cancel the portion of the echo of the outgoing 1000BASE-T signal due to the load on currents I1 and I2 provided by resistors RXA and RXB and load RL on the other side of transformer 50. However the contributions of currents I1 and I2 to voltages VXA and VXB are influenced not only by the resistive loads on I1 and I2, but also by the reactive load associated with the leakage inductance of transformer 50 appearing in parallel with RXA and RXB. Since prior art hybrid 24 of FIG. 2 only cancels the effects on VXA and VXB due to the resistive loads of RXA and RXB on I1 and I2 and does not cancel the effects on VXA and VXB due to their reactive loads, V2 will include echo distortion arising from the reactive loads on I1 and I2.

Class A Driver

Another undesirable feature of hybrid 24 is that its class A driver 48 dissipates substantial amounts of power. Driver 48 is a class A amplifier because, as illustrated in FIGS. 4 and 5, both its output currents I1 and I2 continuously track variations in V1. Since currents I1 and I2 are always on, they continuously dissipate power in resistors RXA and RXB and in their internal transistors in proportion to the sum of the root mean square (RMS) magnitudes of the two current signals.

Class B and AB Drivers

Figure 6:
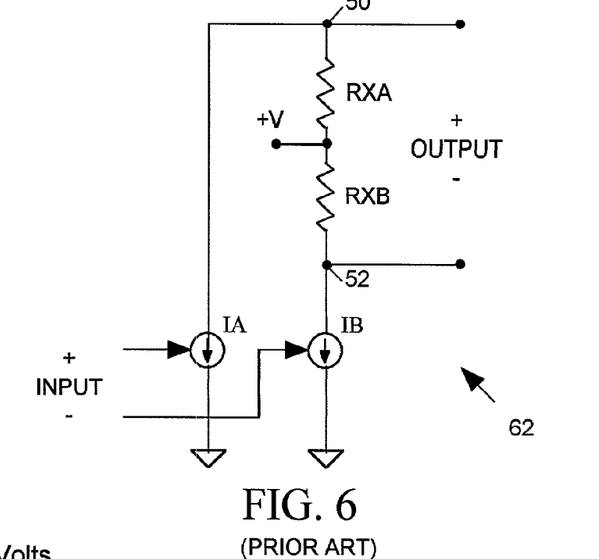
FIG. 6 is a schematic diagram of a prior art class AB amplifier.
Figure 7:
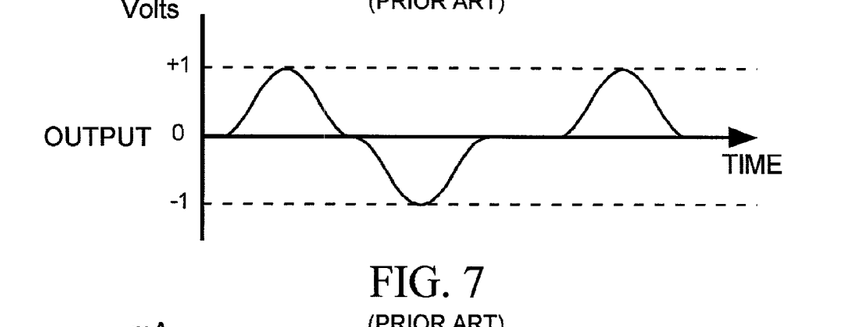
FIGS. 7–9 are timing diagrams illustrating behavior of signals of the amplifier of FIG. 6.
Figure 8:
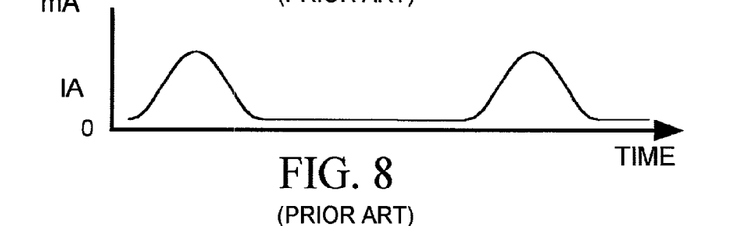
Figure 9:
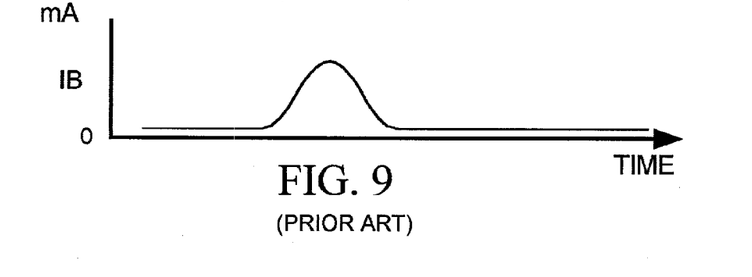

Unlike 1000BASE-T systems, 10BASE-T systems transmit signals in one direction on each UTP, and some 10BASE-TX transmitters employ class B or AB amplifiers as drivers. FIG. 6 illustrates a simple class AB amplifier 62 including a pair of current sources IA and IB supplying currents to output nodes 50 and 52 and a pair of resistors RXA and RXB linking nodes 50 and 52 to a voltage source. FIG. 7 illustrates a typical differential OUTPUT signal waveform driver 62 would generate in response to its INPUT signal. FIGS. 8 and 9 depict the IA and IB waveforms that produce the OUTPUT waveform of FIG. 7. When the INPUT signal is driven positive, current source IA turns fully on and current source IB turns nearly off, and the OUTPUT signal is driven to a +1 volt level. When the INPUT signal is 0 volts, both sources IA and IB turn nearly off and the OUTPUT signal falls to 0 volts. When the INPUT signal is driven negative, source IA nearly turns off, source IB turns fully on, and the OUTPUT signal is driven to a −1 volt level. As seen in FIGS. 8 and 9, class AB amplifier currents IA and IB are asymmetric and that only one of the currents tracks variations in V1 at a time; the other current is nearly off, providing only a small quiescent output current to limit cross-over distortion in the OUTPUT signal. A class B amplifier behaves in a similar manner except that current sources IA and IB fully turn off.

Class B or AB drivers have less power consumption than class A drivers. Since IA and IB are fully on and track changes in the V1 signal only part of the time, they have relatively low RMS values and cause substantially less power dissipation than the currents produced by class A drivers.

When transceiver systems transmit over unidirectional UTPs there is no need for echo cancellation. However class B and AB drivers have not been used in 1000BASE-T systems because they cause a type of echo that has been problematic. In the 1000BASE-T hybrid illustrated in FIG. 2, The VYA and VYB signals are symmetric about a stable common mode voltage. If we were to replace the class A driver 48 with a class B or AB driver, then VYA and VYB would no longer be symmetric and would have a varying common mode voltage. When V1 is negative, I1 is off (class B) or nearly off (class AB) and I2 is fully on, and current I2 would tend to pull VXA above VDD through the inductance of transformer 50, thereby pulling up on the voltage VYA at the inverting input of amplifier 56. Conversely when V1 is positive and I2 is off or nearly off and I1 is fully on, I1 would pull up on VXB, thereby causing an increase in voltage VYX at the non-inverting input of amplifier 56. The variations in VYA and VYB track variations in V1 and produce substantial echo distortion in the output V2 of amplifier 56.

What is needed is 1000BASE-T transceiver employing a more power efficient class B or AB driver which not only properly cancels echo in the output voltage due to the driver's resistive load, but also cancels echo due to the driver's reactive load and due to the asymmetric nature of the class B or AB driver's output signals.

BRIEF SUMMARY OF THE INVENTION

A 1000BASE-T transceiver linked to an unshielded twisted pair (UTP) through a transformer currently transmits and receives outgoing and incoming signals via the UTP. In accordance with one aspect of the invention, the transceiver employs an energy efficient class B or AB line driver supplying asymmetric output currents to the transformer's primary winding terminals for controlling the outgoing 1000BASE-T signal. Since each of the class B or AB driver's output currents is off or very small about half of the time, they dissipate less power than a class A driver.

In accordance with another aspect of the invention, resistors couple each of the transformer's primary winding terminals to separate amplifiers which produce a differential output signal resembling the incoming 1000BASE-T signal. Since the driver output currents influence voltages at the primary winding terminals, echo cancellation circuits provide additional compensating signals for canceling influences of both driver output currents at each of the amplifier inputs, thereby substantially reducing the echo of the outgoing 1000BASE-T signal in the amplifier's differential output.

In accordance with a further aspect of the invention, the echo cancellation circuits compensate the amplifier inputs for echo signals arising from the resistive and reactive loading on each driver current, and also arising from the effects of the asymmetric nature of the driver currents.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The invention described herein relates to a transceiver suitable for use in a 1000BASE-T system employing a class B or a AB driver and providing improved echo cancellation. This specification describes an exemplary embodiment of the invention considered to be the best mode of practicing the invention.

Figure 10:
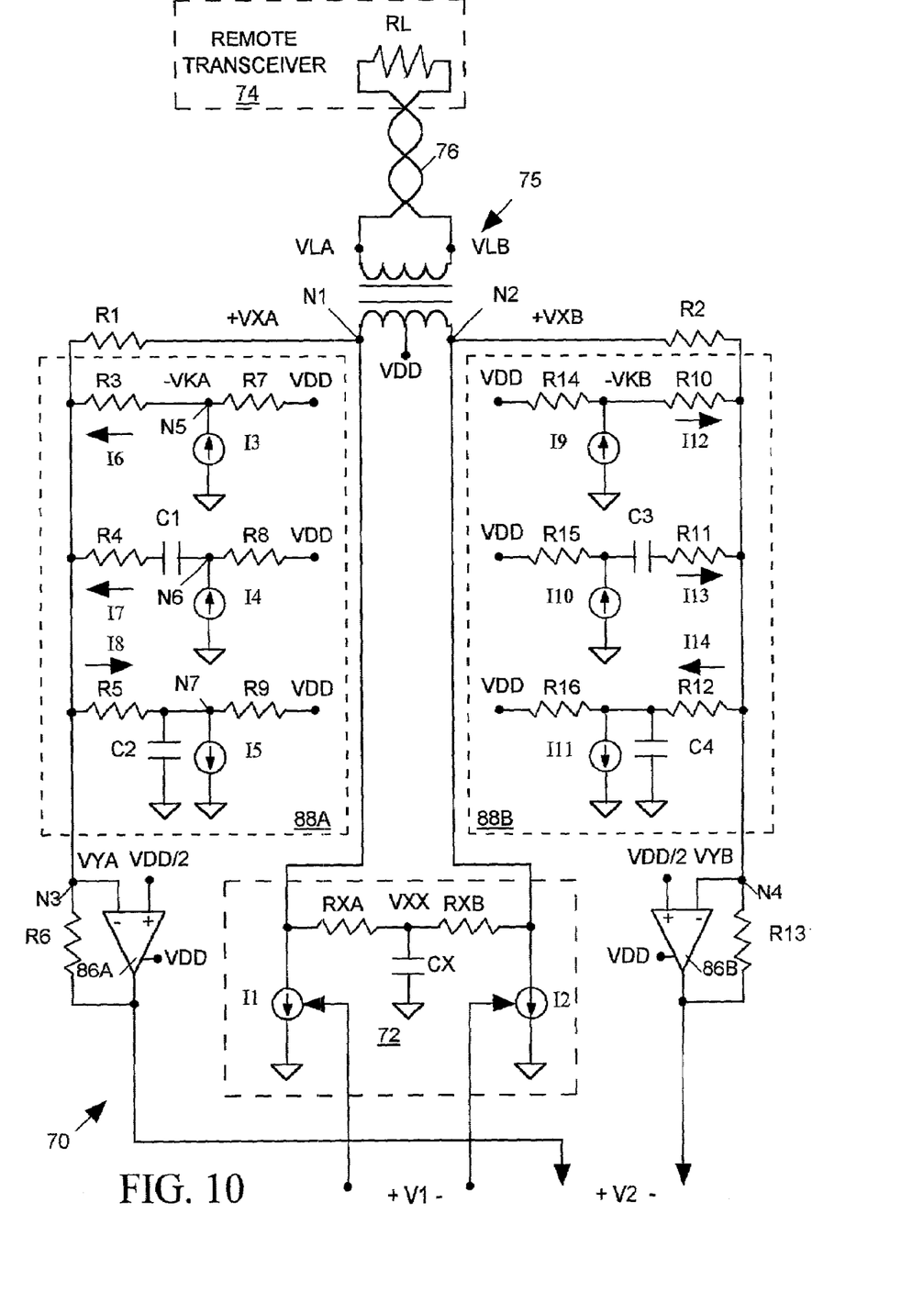
FIG. 10 illustrates in schematic diagram form a hybrid implementing the invention.

FIG. 10 illustrates an improved hybrid circuit 70 in accordance with the invention suitable for replacing the hybrid circuit 24 in the prior art 1000BASE-T transceiver of FIG. 1. Hybrid circuit 70 includes a class AB driver 72 for transmitting a 1000BASE-T signal to a remote transceiver 74 via a transformer 75 and an unshielded twisted pair (UTP) 76 in response to an input signal V1 defining the shape of the outgoing signal.

Driver 72 includes a pair of current sources I1 and I2 controlled by the V1 signal for supplying currents to a pair of nodes N1 and N2. A pair of load resistors RXA and RXB are connected in series between nodes N1 and N2 and a capacitor CX couples the junction between resistors RXA and RXB to ground. Transformer 75 includes a primary winding connected across nodes N1 and N2 and a secondary winding connected across twisted pair 76. The primary winding's center tap is tied to a voltage source VDD.

Figure 11:
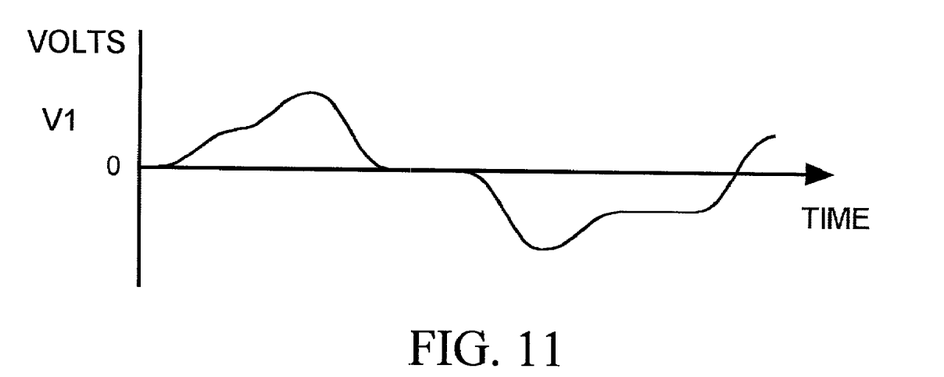
FIGS. 11–13 are timing diagrams illustrating behavior of signals of the hybrid of FIG. 10.
Figure 12:
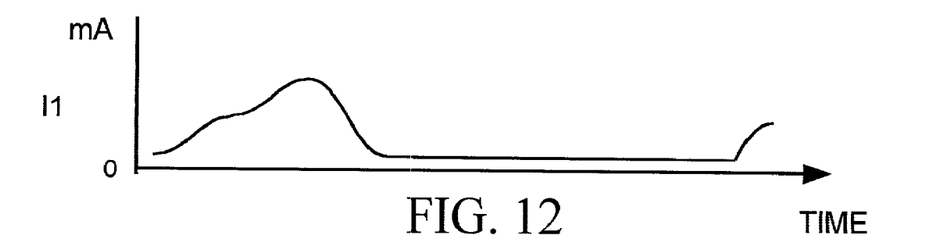
Figure 13:
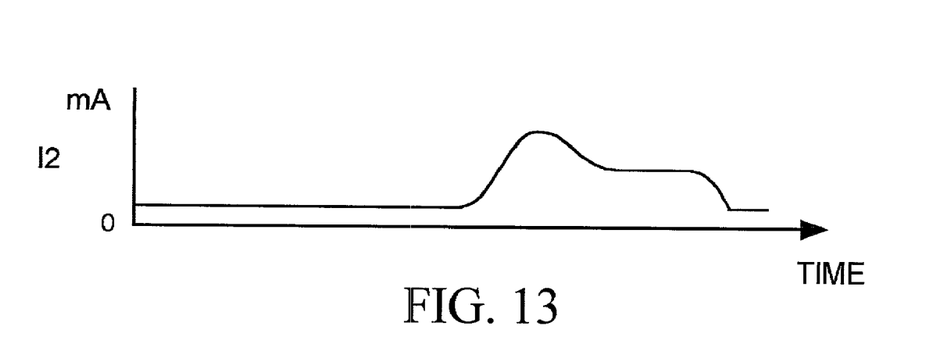

FIG. 11 illustrates a typical V1 signal waveform applied to the class AB driver 72, and FIGS. 12 and 13 illustrate the output currents of current sources I1 and I2 within driver 72 supply to nodes N1 and N2 in response to the V1 waveform of FIG. 11. When V1 is positive, current source I1 supplies an output current to node N1 having a magnitude proportional to the magnitude of the V1 waveform while current source I2 supplies only a relatively small quiescent current to node N2. Conversely, when V1 is negative, current source I2 supplies an output current to node N2 having a magnitude proportional to the negative magnitude of the V1 waveform and current source I1 supplies only a small quiescent current to node N2. (The small quiescent currents help to reduce cross-over distortion.) As portions of currents I1 and I2 pass through the transformer primary winding transformer 75 induces the outgoing 1000BASE-T signal on twisted pair 76.

Comparing the I1 and I2 current waveforms generated by the class AB driver 72 of FIG. 10 to the I1 and I2 waveforms of FIGS. 4 and 5 generated by the class A driver 48 of the prior art hybrid 24 of FIG. 2, note that the RMS magnitudes of the class AB driver output currents are much smaller that those of the class A driver output currents. Since the amount of power dissipation caused by the driver currents is proportional to mean (I1+I2) the class AB driver of FIG. 10 dissipates substantially less power than the class A driver of FIG. 2.

Transformer 75 also receives an incoming 1000BASE-T signal from remote transceiver 74 via UTP 76, and the incoming signal induces currents in the transformer's primary winding. Those currents circulate through load resistors RXA and RXB and contribute to voltages VXA and VXB at nodes N1 and N2. A pair of resistors R1 and R2 link nodes N1 and N2 to a pair of nodes N3 and N4 at inverting inputs of a pair of operational amplifiers 86A and 86B. A voltage source of amplitude VDD/2 drives the non-inverting input of each amplifier 86A and 86B. A pair of resistors R6 and R13 provide gain control feedback between the amplifier outputs and inverting inputs. Amplifiers 86A and 86B amplify the signals VYA and VYB developed at nodes N3 and N4 to produce a differential signal V2 representing the incoming 1000BASE-T signal.

The currents I1 and I2 produced by driver 72 for controlling the outgoing 1000BASE-T signal and the currents produced by transformer 75 in response to the incoming 1000BASE-T signal all contribute to the voltages VYA and VYB at the inputs of amplifiers 86A and 86B. However hybrid 70 includes a pair of echo cancellation circuits 88A and 88B that compensate for the influence of current sources I1 and I2 on the amplifier input signals VYA and VYB so that the amplified voltage difference between those two signals (V2) closely resembles the incoming 1000BASE-T signal and includes relatively little echo of the outgoing 1000BASE-T signal. As described below, each echo cancellation circuit 88A and 88B compensates for three sources of echo.

Resistive Load Compensation

Current source I1 supplies one portion of the current passing through load resistor RXA while transformer 75 supplies another portion of that current in response to the incoming 1000BASE-T signal. Similarly current source I2 and transformer 75 provide the currents passing through resistor RXB. The voltages of VXA and VXB are thus proportional to the sum of currents in RXA and RXB from current sources I1, I2 and from transformer 75. Currents driven by voltages VXA and VXB pass through resistors R1 and R2 and into nodes N3 and N4 at the inputs of amplifiers 86A and 86B and those currents include components that echo the I1 and I2 currents. However echo cancellation circuits 88A and 88B cancel the effects of those echo signals on VYA and VYB by supplying synthesized echo currents into nodes N3 and N4 that are of similar magnitude but opposite in polarity to the resistive loading echo components of the currents passing through resistors R1 and R2.

Echo cancellation circuit 88A includes a current source I3 connected to form a current mirror of source I1 producing a current at a circuit node N5 proportional to, but much smaller than, the output current of source I1. A resistor R7 connects node N5 to source VDD and a resistor R3 connects node N5 to node N3. Resistors R1, R3, R6 and R7 are made relatively large so that they do not significantly load current I1. Resistors R3, R7 and current I3 are also sized relative to resistors R1 and R6 to provide a load on I3 that is a scaled up version of the load resistor RXA provides on current I1. Current I1 causes a drop in the current passing through resistor R1 and into node N3 that is proportional to the magnitude of I1. The echo compensation branch formed by resistors R3, R7 and source I3 supplies a current I6 into node N3 similar in magnitude to the reduction in current into that node caused by I1, thereby canceling the echo in VYA due to the loading of resistor RXA on current I1. In a similar manner, resistors R10 and R14 and a current source I9 mirroring current source I2 supply a current I12 into node N4 at the input of amplifier 86B to cancel the reduction in current into that node arising from the load of resistor RXB on current I2.

Reactive Load Compensation

Another source of loading on currents I1 and I2 is the leakage inductance of transformer 75 appearing in parallel with resistors RXA and RXB. A typical transformer for a 1000BASE-T application has a leakage inductance on the order of tens of nH, and the leakage inductance of transformer 75 acts as a reactive load on currents I1 and I2. Echo signals passing into nodes N3 and N4 resulting from this reactive load have high-pass characteristics with a cutoff in the range 300–400 MHz. To cancel the echo signal into node N3 due to the reactive load on current I1, echo cancellation circuit 88A includes another current source I4 mirrored with source I1 and providing a current proportional to, but much smaller than, the output of source I1 to a node N6. A resistor R8 links node N6 to VDD and a resistor R4 and capacitor C1 in series couple nodes N3 and N6. Resistors R4 and R8 and capacitor C1 are sized to synthesize a load with a DC zero and a 300–400 MHz pole resembling a scaled up version of the reactive load seen by I1. This echo cancellation branch provides a current I7 into node N3 that is equal in magnitude to the reduction in current into node N3 resulting from the load of transformer's leaking inductance on current I1. Resistors R11 and R15, a capacitor C3, and a current source I7 mirrored with current source I2 produce a similar echo cancellation current I13 into node N4 for canceling the reduction in current into node N4 arising from the leakage inductance loading on current I2.

Common Mode Voltage Compensation

When source I1 is nearly off and source I2 is fully on, source I2 causes voltage VXA at node N1 to swing above VDD due to induction via transformer 75, thereby increasing the current into node N3. Similarly when source I2 is nearly off and source I1 is fully on, source I1 pulls voltage VXB above VDD and the current into node N3. Thus, unless the effects of these current increases are canceled, the voltages VYA and VYB at the inputs of amplifiers 86A and 86B will oscillate and cause an echo of the V1 signal in the output signal V2 of amplifiers 86A and 86B.

To compensate for the current into node N3 when I1 is nearly off and I2 is ON, echo cancellation circuit 88A includes a current source I5 mirrored with source I2 for drawing a small current proportional to I2 from a node N7 that is proportional to, but smaller than, I2. A resistor R9 links node N7 to VDD, a capacitor C2 couples node N7 to ground, and a resistor R5 links nodes N3 and N7. Resistors R5 and R9 and capacitor C2 are sized with respect to current I5 and resistors R1 and R6 to provide a scaled up version of the load seen by current I2, including load resistor RXB and the transformed impedances of RXA and RL, where RL is the input impedance of remote transceiver 74. Since transceiver 74 has finite bandwidth when transforming impedance from its secondary winding to its primary winding, the load on I2 possesses low-pass characteristics with cutoff frequency of 200–300 MHz. The R5–R9–C2 network synthesizes a first order low-pass load closely resembling a scaled-up version of that load. The network therefore draws a compensating current I8 from node N3 that cancels the increase in current into node N3 resulting from the load on driver current I2. A pair of resistors R12 and R16, a capacitor C4 and a current source I8 mirrored with source I1 similarly draw a current I14 from node N4 to compensate for the increase in current into node N4 resulting from the load on driver current I1.

The three branches of each echo cancellation circuit 88A and 88B thus reduce echo in the amplifier output V2 by synthesizing currents I6–I9 and I12–I14 at nodes N3 and N4 substantially equal in magnitude but opposite in polarity to the echo currents into or out of nodes N3 and N4 signals resulting from the resistive, and reactive loads on currents I1 and I2. Echo compensation circuits 88A and 88B can reduce the echo of the outgoing 1000BASE-T signal at nodes N3 and N4 by at least 20 dB.

Thus has been shown and described a hybrid for a 1000BASE-T transceiver employing a power efficient class AB driver 72. The hybrid includes echo cancellation circuits 88A and 88B which not only cancel echo in the hybrid's output signal V2 due to the driver's resistive loads RXA and RXB, but which also cancel echo arising from the reactive load of the transformers leakage inductance and arising from the lack of symmetry in the class AB driver's output currents.

The forgoing specification and the drawings depict the best mode of practicing the invention, and elements or steps of the depicted best mode(s) exemplify the elements or steps of the invention as recited in the appended claims. However those of skill in the art will appreciate that other modes of practicing the invention are possible. For example, while in the driver 72 of FIG. 10 has been depicted as a class AB amplifier, it may also be implemented as a class B amplifier. Accordingly the appended claims are intended to apply to any mode of practicing the invention comprising the combination of elements or steps as described in any one of the claims, including elements or steps that are functional equivalents of the example elements or steps depicted in the specification and drawings. Should any appended claim describe an element or step only in terms of its function, then it is intended that the claim's description of the element be interpreted as reading on any element or step having the described function, regardless of any structural limitations associated with any example depicted in this specification or in the drawings.

What is claimed is:

1. An apparatus for concurrently transmitting an outgoing differential signal on a twisted pair in response to an input signal and for amplifying an incoming differential signal arriving on the twisted pair to produce an output signal, the apparatus comprising:
    first, second, third and fourth nodes (N1–N4);
    a first resistor (R1) coupling the first node to the third node;
    a second resistor (R2) coupling the second node to the fourth node;
    first means (75) for inductively coupling the first and second nodes to the twisted pair;
    second means for responding to the input signal by supplying a first current (I1) to the first node and by supplying a second current (I2) to the second node;
    third means (88A) responding to the first and second currents by providing first compensation current (I6–I8) into the third node of magnitude influenced by both the first and second currents; and
    fourth means (88B) for responding to the first and second currents by providing second compensation current (I12–I13) into the fourth node, of magnitude influenced by both the first and second currents.

2. The apparatus in accordance with claim 1 further comprising:
    amplifier means (86A, 86B) for producing the output signal in response to signals appearing at the third and fourth nodes.

3. The apparatus in accordance with claim 1 wherein the first means comprises a transformer including a first winding coupled to the first and second nodes and including a second winding coupled to the twisted pair.

4. The apparatus in accordance with claim 4 further comprising:
    a voltage source,
    wherein the first winding includes a center tap coupled to the voltage source.

5. The apparatus in accordance with claim 1 wherein the second means comprises a class AB driver.

6. The apparatus in accordance with claim 1 wherein the second means comprises a class B driver.

7. The apparatus in accordance with claim 1 wherein the second means comprises:
    first and second load resistors connected in series between said first and second nodes.

8. The apparatus in accordance with claim 7 wherein the second means further comprises:
    a capacitor coupling the first and second resistors to a source of common potential.

9. The apparatus in accordance with claim 1 where the third means comprises:
    a fifth node (N5), and
    means for supplying a third current (I3) proportional to the first current to the fifth node, and
    a third resistor (R3) connected between the third node and the fifth node.

10. The apparatus in accordance with claim 9 wherein the third means further comprises:
    a voltage source (VDD), and
    a seventh resistor (R7) connected between the voltage source and the fifth node.

11. The apparatus in accordance with claim 1 where the third means comprises:
    a sixth node (N6),
    means for supplying a fourth current (I4) proportional to the first current at the sixth node, and
    a fourth resistor (R4) and a first capacitor (C1) connected in series between the third node and the sixth node.

12. The apparatus in accordance with claim 11 wherein the third means further comprises:
    a voltage source (VDD), and
    an eighth resistor (R8) connected between the voltage source and the sixth node.

13. The apparatus in accordance with claim 1 wherein the first and second currents are asymmetric.

14. The apparatus in accordance with claim 1 where the third means comprises:
    a seventh node (N7),
    a source of common potential,
    means for supplying a fifth current (I5) proportional between the seventh node and the source of common potential,
    a fifth resistor (R5) connected between the third node and the seventh node, and
    a second capacitor (C2) connected between the seventh node and the source of common potential.

15. The apparatus in accordance with claim 14 wherein the third means further comprises:
    a voltage source (VDD), and
    a ninth resistor (R9) connected between the voltage source and the seventh node.

16. The apparatus in accordance with claim 1 further comprising:
a voltage source (VDD); and
a source of common potential,
wherein the first means comprises a transformer including a first winding coupled to the first and second nodes having a center tap coupled to the voltage source, and including a second winding coupled to the twisted pair, and
wherein the second means comprises first and second load resistors connected in series between said first and second nodes and a capacitor (CX) coupling the first and second resistors to a source of common potential.

17. The apparatus in accordance with claim 16 where the third means comprises:
a seventh node (N7),
means for supplying a fifth current (I5) proportional between the seventh node and the source of common potential,
a fifth resistor (R5) connected between the third node and the seventh node,
a second capacitor (C2) connected between the seventh node and the source of common potential, and
a ninth resistor (R9) connected between the voltage source and the seventh node.

18. The apparatus in accordance with claim 16 where the third means further comprises:
a sixth node (N6),
means for supplying a fourth current (I4) proportional to the first current at the sixth node,
a fourth resistor (R4) and a first capacitor (C1) connected in series between the third node and the sixth node, and
an eighth resistor (R8) connected between the voltage source and the sixth node.

19. The apparatus in accordance with claim 17 where the third means further comprises:
a sixth node (N6),
means for supplying a fourth current (I4) proportional to the first current at the sixth node,
a fourth resistor (R4) and a first capacitor (C1) connected in series between the third node and the sixth node, and
an eighth resistor (R8) connected between the voltage source and the sixth node.

20. The apparatus in accordance with claim 19 where the third means further comprises:
a fifth node (N5),
means for supplying a third current (I3) proportional to the first current to the fifth node,
a third resistor (R3) connected between the third node and the fifth node,
a seventh resistor (R7) connected between the voltage source and the fifth node.

21. The apparatus in accordance with claim 16 wherein the second means comprises a class AB driver.

22. The apparatus in accordance with claim 16 wherein the second means comprises a class B driver.

23. The apparatus in accordance with claim 16 wherein the first and second currents are asymmetric.

24. A method for reducing an echo of an outgoing differential signal in an output signal of an apparatus for concurrently transmitting the outgoing differential signal on a twisted pair in response to an input signal and for amplifying an incoming differential signal arriving on the twisted pair to produce the output signal, wherein the apparatus includes a first resistor (R1) coupling a first node (N1) to a third node (N3), a second resistor (R2) coupling a second node (N2) to a fourth node (N4), a transformer (75) for coupling the first and second nodes to the twisted pair, means for responding to the input signal by supplying a first current (I1) to the first node and by supplying a second current (I2) to the second node, the first and second currents being asymmetric, and amplifier means (86A, 86B) for generating the output signal in response to signal appearing the third and fourth nodes, the method comprising the steps of:
a. providing first compensation current (I6–I8) into the third node of magnitude influenced by both the first and second currents; and
b. providing second compensation current (I12–I13) into the fourth node, of magnitude influenced by both the first and second currents.

25. The method in accordance with claim 24
wherein the first compensation current includes a first component current (I7) substantially offsetting variation in current into the third node resulting from reactive loading on the first current, and
wherein the second compensation current includes a second component current (I10) substantially offsetting a variation in current into the fourth node resulting from a reactive load on the second current.

26. The method in accordance with claim 24
wherein the first compensation current includes a third component (I8) offsetting variation in current into the third node resulting from a load on the second current, and
wherein the second compensation current includes a fourth component current (I11) substantially offsetting a variation in current into the fourth node resulting from a load on the first current.

27. The method in accordance with claim 26
wherein the first compensation current includes a third component (I8) offsetting variation in current into the third node resulting from a load on the second current, and
wherein the second compensation current includes a fourth component current (I11) substantially offsetting a variation in current into the fourth node resulting from a load on the first current.

28. The method in accordance with claim 27
wherein the first compensation current includes a fifth component current (I6) substantially offsetting variation in current into the third node resulting from resistive loading on the first current, and
wherein the second compensation current includes a sixth component current (I12) substantially offsetting a variation in current into the fourth node resulting from a reactive load on the second current.

* * * * *

UNITED STATES PATENT AND TRADEMARK OFFICE
CERTIFICATE OF CORRECTION

PATENT NO. : 7,002,931 B2  Page 1 of 1
DATED : February 21, 2006
INVENTOR(S) : Gerchih Chou and Leon Chia-Liang Lin It is certified that error appears in the above-identified patent and that said Letters Patent is hereby corrected as shown below:

Column 4,
Line 9, replace "12" with -- I2 --.

Column 8,
Line 55, replace "12" with -- I2 --.

Signed and Sealed this

Thirtieth Day of May, 2006

JON W. DUDAS
*Director of the United States Patent and Trademark Office*